United States Patent
Fasen et al.

(10) Patent No.: US 7,295,506 B2
(45) Date of Patent: Nov. 13, 2007

(54) ELLIPTICAL-SHAPED NANO-SCALE TIP

(75) Inventors: Donald Fasen, Boise, ID (US);
Richard L. Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 562 days.

(21) Appl. No.: 10/913,477

(22) Filed: Aug. 9, 2004

(65) Prior Publication Data

US 2006/0028965 A1    Feb. 9, 2006

(51) Int. Cl.
*G11B 7/00* (2006.01)
(52) U.S. Cl. .................................................... 369/126

(58) Field of Classification Search ............... 369/126, 369/100; 438/29
See application file for complete search history.

(56) References Cited

U.S. PATENT DOCUMENTS

| | | | |
|---|---|---|---|
| 5,734,632 A * | 3/1998 | Ito et al. .................. | 369/44.23 |
| 6,974,712 B2 * | 12/2005 | Ouchi et al. .................. | 438/29 |
| 7,180,847 B2 * | 2/2007 | Binnig et al. ............... | 369/126 |

* cited by examiner

*Primary Examiner*—Nabil Hindi (57) ABSTRACT

A nano-scale tip for use on a probe includes a first width and a second width. The first width of the tip is greater than the second width and the varying sized widths form a substantially elliptical shape.

16 Claims, 6 Drawing Sheets

ELLIPTICAL-SHAPED NANO-SCALE TIP

BACKGROUND

Electronic storage devices ("storage devices") are capable of storing information in electronic form. Storage devices typically include a media for storing the information and some types of read and write mechanisms for reading information from the media, and writing information to the media, respectively. Storage devices often also include a system for identifying locations on media where information may be read or written.

To store information, a storage device generally positions its write mechanism relative to the location on the media where the information is to be written. The write mechanism then causes the information to be stored. For the storage device to operate properly, the storage device should also be able to read the stored information. More particularly, the storage device should be able to reliably return a read mechanism to the location on the media where the information was written. Otherwise, information written to the storage device may not be retrieved from the media.

One type of storage device is a memory module that includes one or more micromovers, that is, movers that use flexures to move a media relative to a plurality of read and write mechanisms. As the movers move the media, the read and write mechanisms read from or write to the media at designated locations. As with storage devices generally, a memory module needs to be able to accurately position its read and write mechanisms to allow information to be retrieved reliably. However, conventional storage devices often require relatively expensive equipment to enable the read and write mechanisms to be precisely positioned.

It would be desirable to have relatively simple and inexpensive read and write mechanisms that afford lower sensitivity to positional defects.

SUMMARY

A nano-scale tip for use on a probe includes a first width and a second width. The first width of the tip is greater than the second width and the varying sized widths form a substantially elliptical shape.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Throughout the present disclosure, reference is made to a tip having an "elliptical" or a substantially "elliptical" shape. It is to be understood that the terms "elliptical" and "substantially elliptical" are not intended to limit the tip to a perfect elliptical shape. Instead, the terms "elliptical" and "substantially elliptical" are intended to define the shape of the tip as having an elliptical-like shape, which may include imperfect elliptical shapes as defined further hereinbelow.

In one example, a tip for use in nano-scale applications includes a substantially elliptical cross-sectional shape. Therefore, the tip has two different widths, and more particularly, a smaller width in a down track direction and a larger width in an across track direction. As will be described in greater detail hereinbelow, the differences in widths generally enables a very tight bit density in the down track direction for high capacity while enabling significantly lower sensitivity to off track changes in the across track direction.

Examples of applications in which the substantially elliptical-shaped tip may be used include probe-based data storage devices, servo positioning systems, etc.

A method of manufacturing the substantially elliptical-shaped tip is also provided. In the method, the tip is formed with a substantially elliptical-shaped cross-section from a substantially rectangular starting pedestal.

Figure 1A:
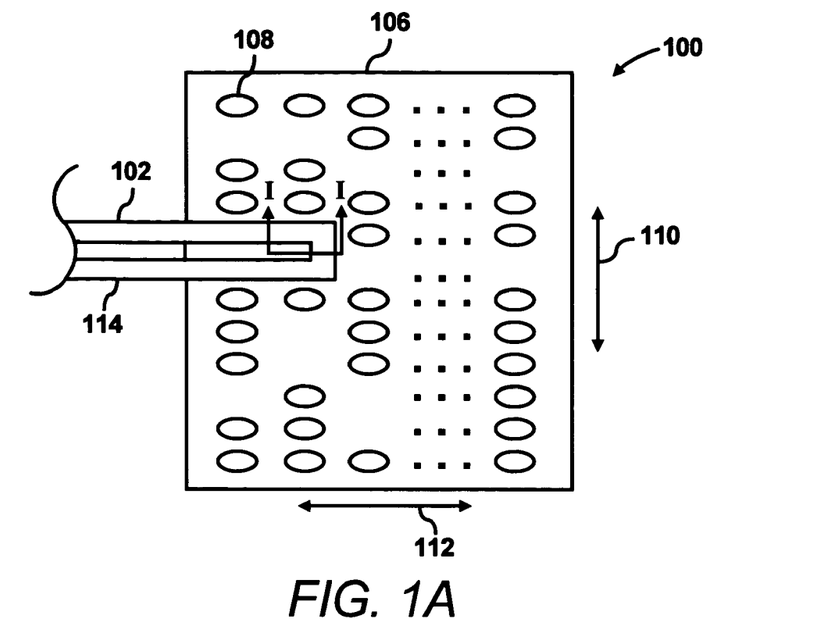
FIG. 1A illustrates a simplified plan view of a portion of a probe-based data storage device having a probe with a substantially elliptical-shaped tip.
Figure 1B:
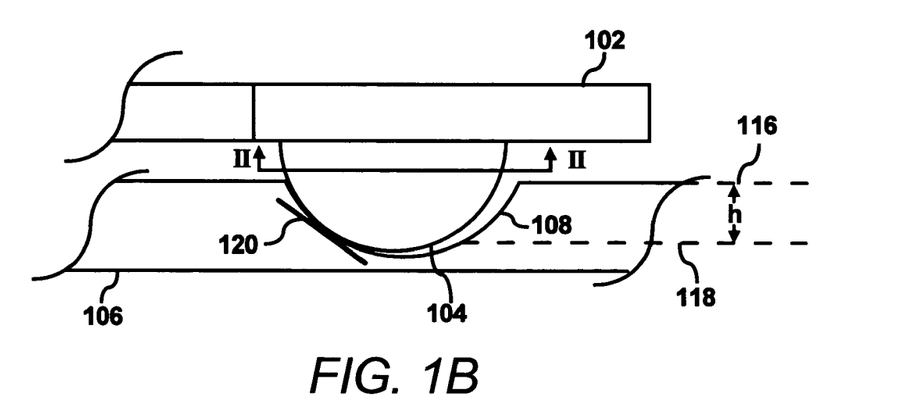
FIG. 1B is an enlarged view of the tip and a pit taken along lines I-I in FIG. 1A.

FIG. 1A illustrates a simplified plan view of a portion of a probe-based data storage device 100 having a probe 102 with a substantially elliptical-shaped tip 104 (as shown in FIG. 1B). It should be readily apparent to those of ordinary skill in the art that the storage device 100 depicted in FIG. 1A represents a generalized illustration and that other components may be added or existing components may be removed or modified without departing from a scope of the storage device 100. For example, the storage device 100 may include any number of probes 102 and various other components.

More particularly, although a single probe 102 is illustrated in FIG. 1A, any number of probes 102 may be provided in any reasonably suitable array without departing from a scope of the storage device 100. In addition, any number of substrates 106 having any number of pits 108 may also be provided within the scope of the storage device 100 disclosed herein. Therefore, the depiction and discussion of one probe 102 and one substrate 106 is for purposes of simplicity of description and is not intended to limit the storage device 100 in any respect.

The storage device 100 may be considered as a probe-based storage device because the storage device 100 includes a probe 102 configured as a writing mechanism and a reading mechanism. In certain instances, the probe 102 may be used as part of a servo positioning system. In any regard, the storage device 100 includes a substrate 106 formed of a material configured to deform through application of energy, for instance, heat. By way of example, the substrate 106 may comprise any reasonably suitable material known in the art to be used in probe-based storage devices, for instance, a polymer material.

In operation, the probe 102 is employed to perform both writing and reading operations on the substrate 106. In performing a writing operation, the probe 102 is heated and the heat energy is transferred to a location on the substrate 108 through the tip 104. Through application of the heat energy, an area where the tip 104 is in contact with the substrate 106 deforms and creates a pit 108 generally in the shape of the tip 104. In this instance, because the tip 104 is substantially elliptical in shape, the pits 108 created by the tip 104 are also substantially elliptical in shape. In other instances, the probe 102 may also be used to perform erasing operations by applying sufficient heat to the probe 102 to erase the pits 108.

Variously located pits 108 may be formed through movement between the substrate 106 and the probe 102 with respect to each other. More particularly, one or both of the substrate 106 and the probe 102 may be relatively displaced with respect to each other in a down track 110 direction and an across track 112 direction. In one example, one or both of the substrate 106 and the probe 102 may be positioned on movers (not shown). Suitable movers are micro-movers, such as the micro-movers described in U.S. Pat. No. 5,834,864, entitled "Magnetic Micro-Mover", and U.S. Pat. No. 6,583,524, entitled "Micro-Mover with Balanced Dynamics", both of which are incorporated by reference in their entireties.

The pits 108 may represent data bits and may be created in an organized pattern to represent information. Thus, the probe 102 may be repositioned with respect to the substrate 106 to thereby create the pits 108 at the desired locations on the substrate 106 to form the organized pattern. The information may comprise instructions and/or data that may be processed by a processing system, such as a computer system, as well as other types of information, such as, for instance, servo position information.

In performing a reading operation, at least one of the probe 102 and the substrate 106 may be moved in either or both of the down track 110 direction and the across track 112 direction to determine the locations of the pits 108. The probe 102 generally includes a cantilever portion 114 with the tip 104 located at a proximate distal end of the cantilever portion 114. The cantilever portion 114 may be biased in a direction toward the substrate 106 to generally cause the tip 104 to contact the substrate 106. Thus, as either or both of the substrate 106 and the probe 102 are moved with respect to each other, the tip 104 slides across the surface of the substrate 106. When the tip 104 reaches a pit 108, the tip 104 is configured to fall into the pit 108 to thereby cause a height change in the probe 102. The detected height changes generally provide indications of the locations of the pits 108.

As shown in greater detail in FIG. 1B, which is an enlarged view of the tip 104 and a pit 108 taken along lines I-I in FIG. 1A, when the probe 102, and more particularly, the tip 104 reaches a pit 108, the tip 104 becomes inserted into the pit 108. Reference line 116 indicates a starting height position of the tip 104 prior to becoming inserted into the pit 108 and reference line 118 indicates an ending height position of the tip 104 following insertion into the pit 108. As shown, the height change (h) of the probe 102 is the difference in height between the starting and ending positions of the tip 104. The strength of the signal generated to indicate that a pit 108 is present may be considered as a function of the height change in the probe 102. Thus, the greater the height change, the greater the signal strength.

Figure 1C:
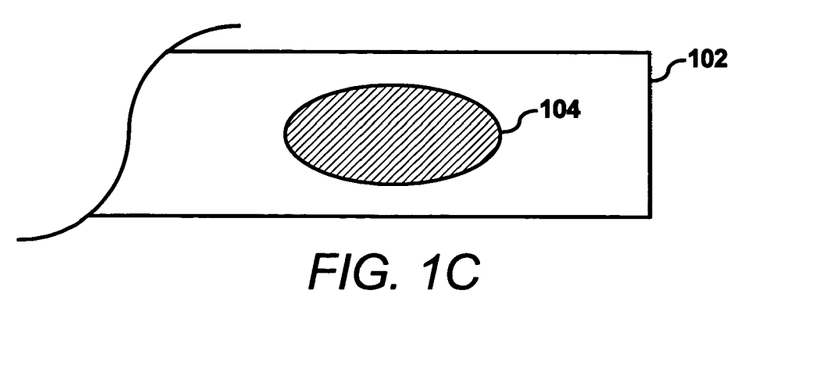
FIG. 1C is a cross-sectional view taken along lines II-II of FIG. 1B.

Also shown in FIG. 1B is a reference line 120 that generally shows the slope of the tip 104 along a contact location on the pit 108. By virtue of the substantially elliptical shape of the tip 104, the width of the tip 104 in the across track 112 direction is larger than the width of the tip 104 in the down track 110 direction as shown in greater detail in FIG. 1C, which is a cross-sectional view taken along lines II-II of FIG. 1B. In one instance, the width of the tip 104 in the across track 112 direction may be about 25-300% larger than the width of the tip 104 in the down track 110 direction. In some instances, the width of the tip 104 in the across track direction 112 may be three or more times greater than the width of the tip 104 in the down track 110 direction. Therefore, the slope of the tip 104 in the across track 112 direction is lower than the slope of the tip 104 in the down track 110 direction. In contrast, therefore, to the slope represented by the reference line 214 depicted in FIG. 2B, the slope of the reference line 120 is relatively lower in the across track 112 direction.

The slope of the tip 104 in the down track 110 direction may be kept at the relatively high slope to thus enable a highly tight bit density for high storage capacity. However, in comparison with known probe tips, the slope of the tip 104 in the across track 112 is relatively lower to substantially reduce the slope of the point of contact between the tip 104 and the pit 108. The reduction in the slope of the point of contact generally reduces the sensitivity of the read-back amplitude as the tip 104 moves off the center of the pit 108. This allows the tip 104 to be mis-registered with respect to the pits 108 and to maintain read-back signal amplitude and thus the error rate. In other words, by forming the tip 104 to have a substantially elliptical shape, the error rate in detecting pits 108 is substantially reduced as the detections in height changes of the probe 102 is less sensitive to deviations of the tip 104 from the centers of the pits 108.

Figure 2A:
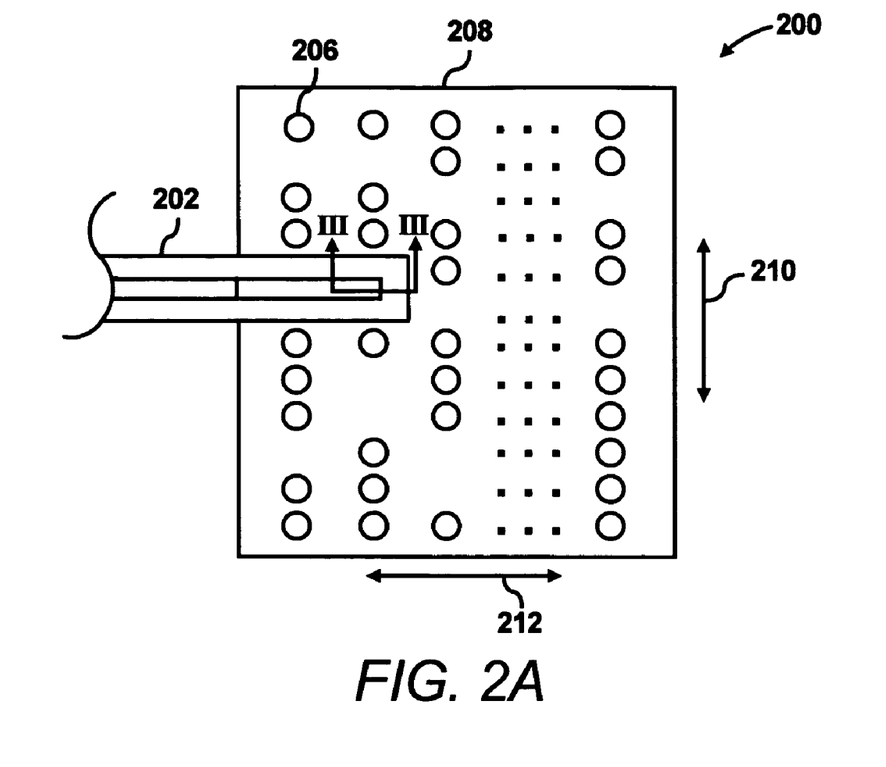
FIG. 2A is a plan view of a portion of a conventional probe-based data storage device.

A comparison of the storage device 100 depicted in FIG. 1A is made with reference to a conventional storage device 200, depicted in FIG. 2A. As shown in FIG. 2A, the conventional storage device 200 includes a probe 202 having a round tip 204 (FIG. 2B), in cross-section. The probe 202 is used as the reading and writing device. More particularly, during a writing operation, the probe 202 is heated and pits 206 are formed in a substrate 208 through conduction of the heat through the tip 204. In addition, during a reading operation, the tip 204 is dropped into a pit 206. To enable the reading and writing operations, the substrate 208 is moved in a down track 210 direction and an across track 212 direction.

Figure 2B:
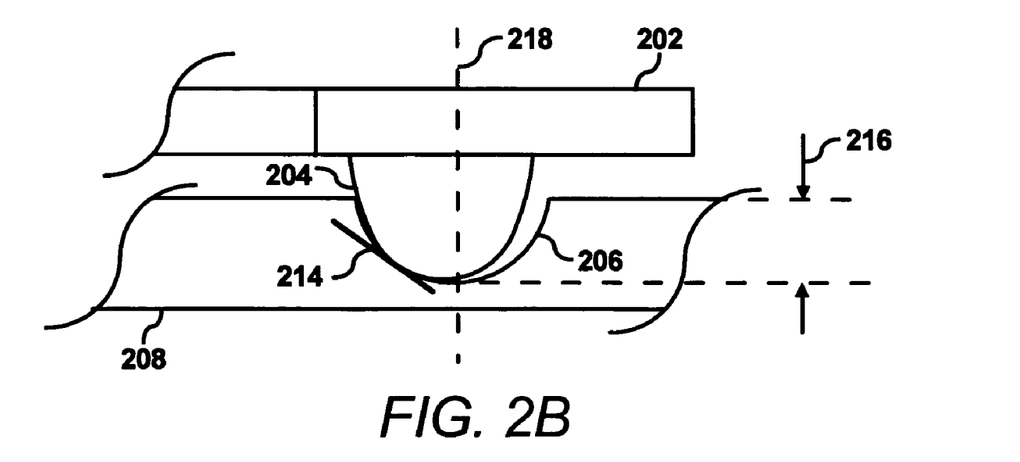
FIG. 2B is an enlarge view of the tip and a pit taken along lines III-III in FIG. 2A.

With reference now to FIG. 2B, there is shown an enlarged cross-sectional side view taken along lines III-III of FIG. 2A. In addition, the side view taken along lines III-III is considered as being viewed along the down track 210 direction. However, because the tip 204 is symmetric, and more particularly, round, the depiction in FIG. 2B of the tip 204 and the pit 206 is also valid if viewed along the across track 212 direction. As shown, the tip 204 of the probe 202 has been inserted into a pit 206 of the substrate 208. A reference line 214 is also shown to indicate the relative angles between the tip 204 and the pit 206. In addition, reference lines 216 are shown to indicate the depth in which the tip 204 is inserted into the pit 206, which translates into the height drop of the probe 202. In essence, the signal returned regarding the pit 206 is a function of the height drop of the probe 202. In addition, the height drop of the probe 202 is substantially affected by the distance the tip 204 is from a track center, as indicated by the reference line 218. That is, the signal returned by the probe 202 is greatly reduced as the tip 204 goes further away from the track center 218.

In comparing the storage device 100 with the conventional storage device 200, it is clear that the pits 108 of the storage device 100 have different shapes than the pits 206 of the conventional storage device 200. More particularly, because the tip 104 is substantially elliptical in shape and the tip 204 is round, the pits 108 formed by the tip 104 are wider in the across track direction 112. In addition, the slope 120 of the tip 104 at a contact point with the pit 108 along the across track 112 direction is substantially lower than the slope 214 of the tip 204 at the contact point with the pit 206. The slopes of the tips 104 and 204 may be equivalent in the down track 110 and 210 directions and may thus be represented by the reference line 214.

The slopes of the tips 104 and 204 may be relatively steep in the down track 110 and 210 directions, which generally allows the tips 104 and 204 to move in and out of the respective pits 108 and 206 relatively quickly when reading in the down track direction 220. As described hereinabove, the read-back signal strengths are functions of how far the respective tips 104 and 204 enter into the pits 108 and 206. A steeper slope in the across track direction 112 would cause the signals to degrade more rapidly when the tips 104 move off center of the pits 108. Alternatively, a more shallow slope in the across track direction 112, such as the slope represented by the reference line 120, generally causes the signal to degrade less rapidly and therefore allows the probe 102 to be less sensitive to situations where the tip 104 is off center with respect to the pit 108.

During reading of data bits, or pits 108, 206, the tip 104, 204 may go off-track, or in other words, deviate from a center of the pits 108, 206, in the across track direction 112, 212 for various reasons, such as thermal effects, mechanical tolerances being exceeded, external shock and vibration of a storage device, etc. If the tip 104, 204 goes off-track, the amplitude of the signal read will be lower than if the tip 104, 204 is centered in the pits 108, 206. One reason for this decrease in signal amplitude is because the height in which the tip 104, 204 drops into the pits 108, 206 may be reduced. This would lead to a lower signal to noise ratio and a higher error rate in the reading. However, as described above, through use of the substantially elliptical-shaped tip 104, the decrease in signal amplitude may be reduced as this tip 104 generally enables less sensitivity to off-track readings as shown in greater detail with respect to FIG. 3.

Figure 3:
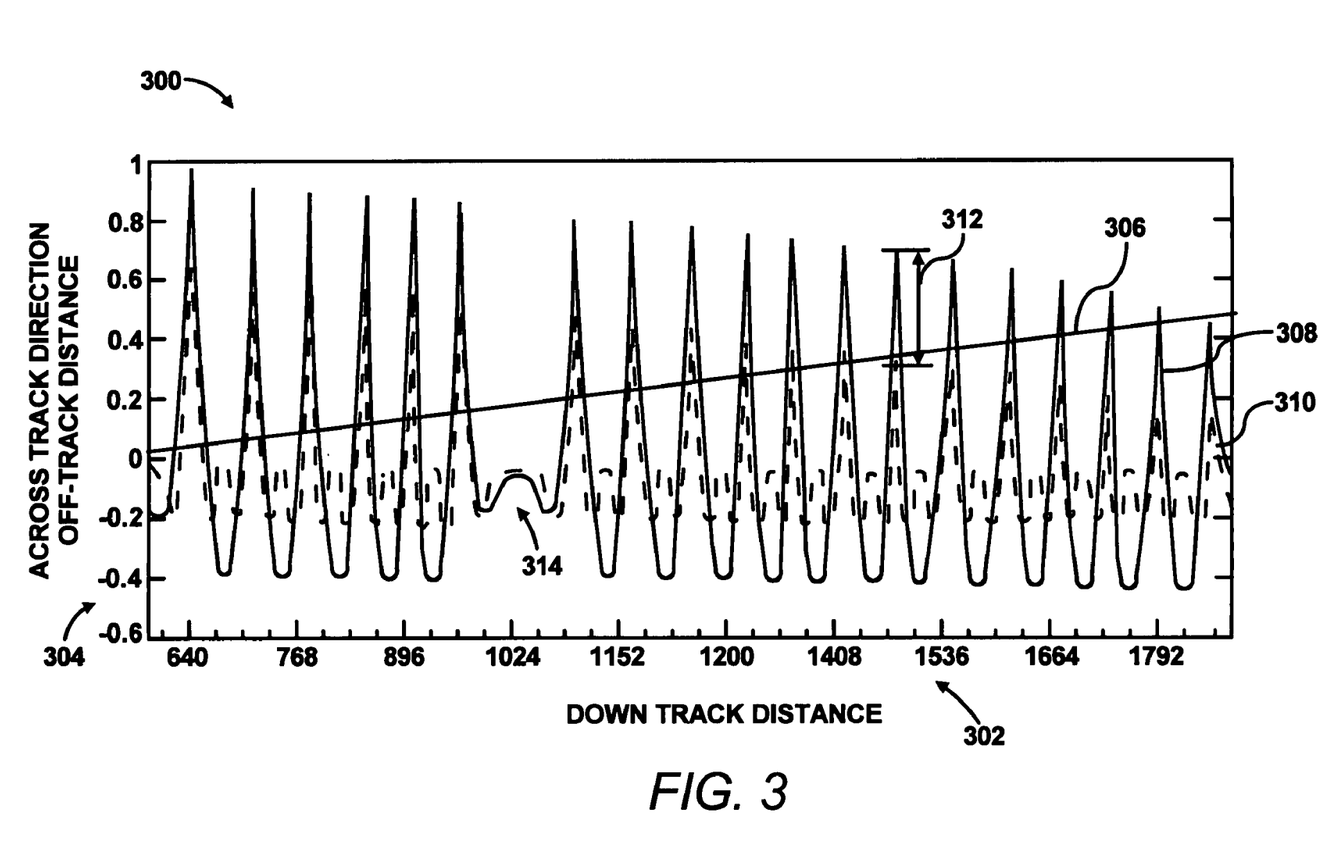
FIG. 3 is a graph illustrating the read-back signal amplitudes of pits by a corresponding pair of tips having different radii at various off-track distances.

FIG. 3 is a graph 300 illustrating the read-back signal amplitudes of pits by a corresponding pair of tips having different radii as the tips move in a down track direction 110. The graph 300 represents a generalized illustration and is not intended to limit the substantially elliptical-shaped tips in any respect. Instead, the graph 300 is provided to illustrate certain aspects of the substantially elliptical-shaped tips described herein.

The distances the tips move in the down track direction 110 are indicated along a first axis 302 of the graph 300 and are in nanometers. The distances the tips move off-track in the across track direction 112 are indicated along a second axis 304 of the graph 300 and are represented by a reference line 306. The distances listed along the second axis 304 represent the actual distances divided by ten (10) and are also in nanometers. As the reference line 306 indicates, the tips are illustrated as moving further off-track in the across track direction 112 as the tips are moving further along the down-track direction 110.

A first signal 308, depicted as a solid line, signifies the read-back signal amplitudes obtained through use of a tip having a first radius. In addition, a second signal 310, depicted as a dashed line, signifies the read-back signal amplitudes obtained through use of a tip having second radius. In the example shown in FIG. 3, the first radius is larger than the second radius. More particularly, in the experiment used to create the graph 300, the first radius was 20 nm and the second radius was 10 nm. In addition, the tips used to create the graph 300 had the same heights. Therefore, the slope of the tip used to create the first signal 308 is shallower than the slope of the tip used to create the second signal 310.

As shown in the graph 300, the read-back signal amplitudes of the first signal 308 and the second signal 310 are nearly identical when the tips are near the track center in the across track direction 112. For instance, the peaks of the first signal 308 and the second signal 310 almost reach the same levels when the distance traveled down track 110 is below around 1000 nm. However, as the tips move further down track 110, and thus, move a further distance off-track in the across track direction 112, for instance, at around 1200 nm down track, the peaks of the first signal 308 and the second signal 310 clearly begin to differ from each other. More particularly, the gaps 312 between the peaks of the first signal 308 and the second signal 310 become increasingly greater the further the tips move off-track in the across track direction 112. Incidentally, the portion 314 of the graph 300 represents the read-back amplitudes of a missing bit.

The graph 300 generally indicates that the tip having the larger radius and therefore the shallower slope provides greater read-back signal amplitudes at further distances from the track center. Therefore, by using a tip 104 having a substantially elliptical shape, with the wider side extending in the across track direction 112, the sensitivity to moving off-track is substantially reduced as compared to conventional round shaped tips 204. In addition, the tip 104 also affords the benefit of enabling relatively densely populated pits 108 to be formed in the substrate 106 due to its smaller width in the down track 110 direction.

In certain instances, the substrate 106 may comprise a servo cluster and the pits 108 may comprise servo information formed in the servo cluster. The tip 104 may be used in this instance to write/read servo information or pits 108 from servo cluster or substrate 106 to thereby generate position signals. A more detailed description of servo clusters as well as a general environment in which servo clusters may be used may be found in co-pending and commonly assigned U.S. patent application Ser. No. 10/700,065 entitled "Memory", filed on Nov. 3, 2003, the disclosure of which is herein incorporated in its entirety.

Figure 4:
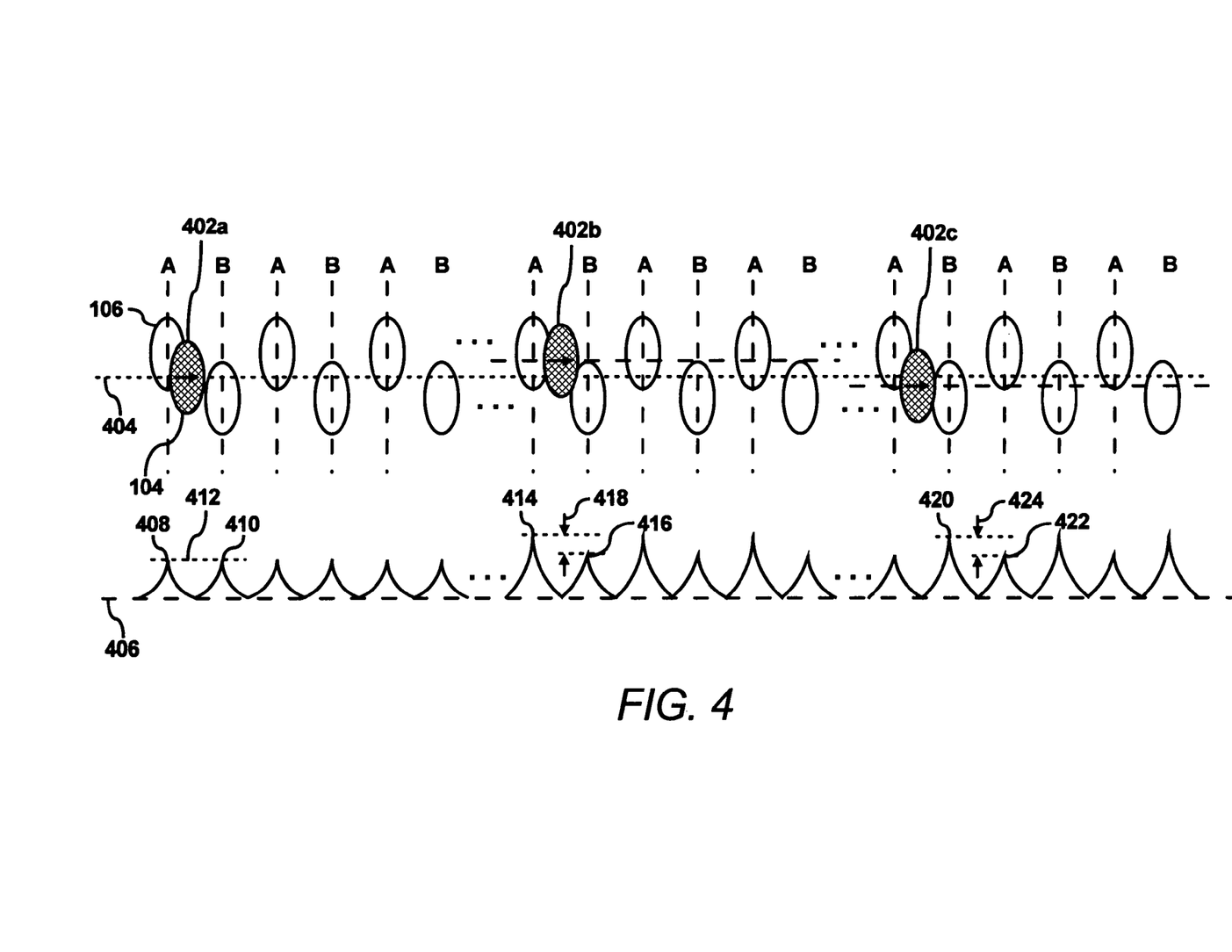
FIG. 4 illustrates the reading of servo information or pits with a tip having a substantially elliptical-shaped shape.

FIG. 4 illustrates the reading of servo information or pits 108 with a tip 104 having a substantially elliptical shape. The pits 108 are illustrated as having similar elliptical shapes to the tip 104, which may occur, for instance, when the tip 104 is used to create the pits 108. As shown in FIG. 4, the tip 104 is shown at three different points 402a, 402b, and 402c along a track 404 in a track region of a servo cluster. A graph 406 illustrates the analog readback signal generated at each of these points.

At point 402a, the tip 104 is centered on the track 404 as it moves along the track 404. Accordingly, the tip 104 and more particularly, the probe 102, detects servo bits in the A and B regions equally and peaks 408 and 410 of the analog readback signal generated by the tip 104 in the A and B regions, respectively, are of equal amplitude as indicated by a dotted line 412.

At point 402b, however, the tip 104 drifts toward the side of the track 108 where the servo bits 106 appear in the A regions as it moves along track 404. As a result, the tip 104 detects servo bits 106 in the A regions more strongly than it detects the servo bits 106 in the B regions. Accordingly, peaks of the analog readback signal in the A regions, such as peak 414, have a higher amplitude than the peaks in the B regions, such as peak 416, as indicated by a difference between the peaks 418. However, the difference 418 in the peaks 414 and 416 is relatively small because of the substantially elliptical shape of the tip 104. As described in greater detail hereinabove, the substantially elliptical shape of the tip 104 generally enables a reduced sensitivity to the tip 104 being moved off the track 404 center.

At point 402c, the tip 104 drifts toward the side of track 404 where the servo bits 106 appear in the B regions as it moves along the track 404. As a result, the tip 104 detects servo bits 106 in the B regions more strongly than it detects the servo bits 106 in the A regions. Accordingly, peaks of the analog readback signal in the B regions, such as peak 420, have a higher amplitude than the peaks in the A regions, such as peak 422, as indicated by a difference between the peaks 424. Again, the differences 424 in the amplitudes of the peaks 420 and 422 is relatively small due to the substantially elliptical shape of the tip 104. In addition, the substantially elliptical shape of the tip 104 generally enables the servo bits 106 to be spaced in a relatively dense configuration along the direction of the track 404, which enables substantially high resolutions in the positioning of the servo.

Through implementation of the substantially elliptical-shaped tip 104 disclosed herein, information may be read in a relatively accurate manner from pits 108 even when the tip 104 moves a relatively large distance off-track. This information may be used, for instance, for data storage purposes or for servo positioning purposes as described hereinabove. In one regard, therefore, additional calibration or mechanisms designed to keep the tip 104 substantially centered along a track may substantially be avoided. One result of which may be that the costs associated with operating probe-based storage devices or servo positioning devices may substantially be reduced in comparison with known devices of this type.

Figure 5:
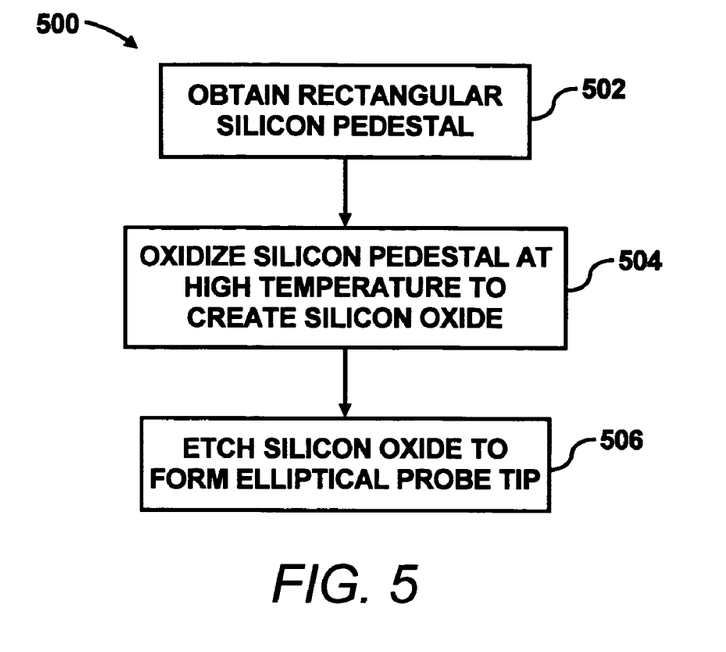
FIG. 5 shows an operational mode of a manner in which the substantially elliptical-shaped tip illustrated, for instance, in FIG. 1B, may be formed.

With reference now to FIG. 5, there is shown an operational mode 500 of a manner in which the substantially elliptical-shaped tip 104 may be formed. It is to be understood that the following description of the operational mode 500 is but one manner of a variety of different manners in which the substantially elliptical tip 104 may be formed. It should also be apparent to those of ordinary skill in the art that the operational mode 500 represents a generalized illustration and that other steps may be added or existing steps may be removed or modified without departing from a scope of the operational mode 500.

Figure 6:
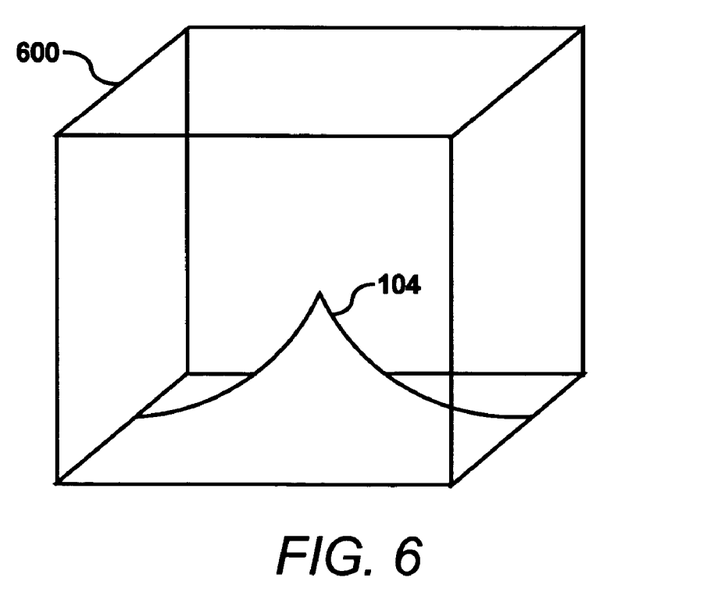
FIG. 6 illustrates a rectangular silicon pedestal that may be used in the operational mode depicted in FIG. 5.

As shown in FIG. 5, a rectangular silicon pedestal 600 (FIG. 6) is obtained at step 502. More particularly, the silicon pedestal 600 is a three dimensional structure having a rectangular cross-section. At step 504, the silicon pedestal 600 is oxidized at a substantially high temperature to create silicon oxide. In addition, the silicon oxide is etched at step 506 to form the substantially elliptical-shaped tip 104 as shown in FIG. 6. The etching process may be performed using one or both of a chemical etching process and a dry etching process.

The operations set forth in the operational mode 500 may be contained as a utility, program, or subprogram, in any desired computer accessible medium. In addition, the operational mode 500 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 7:
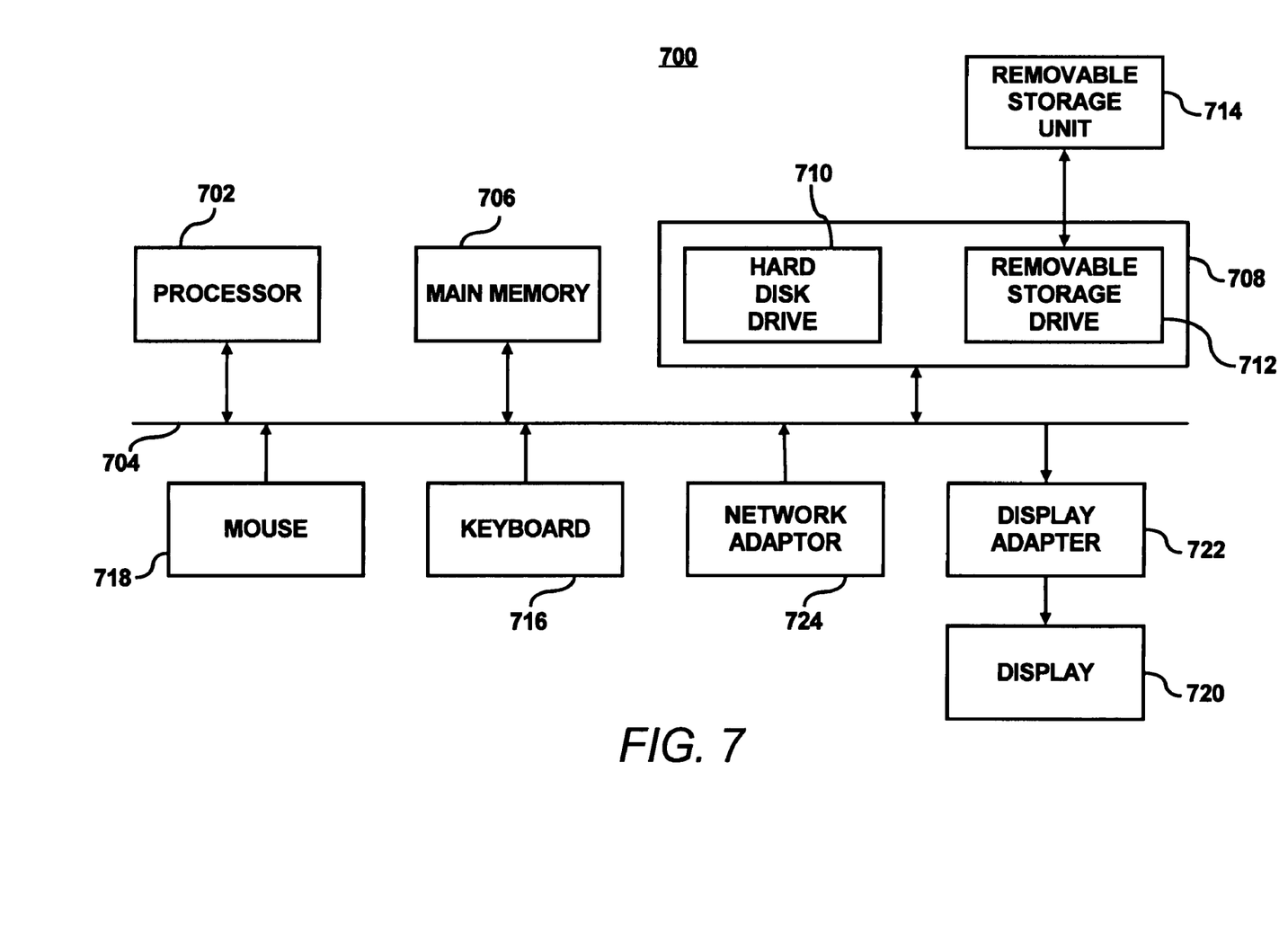
FIG. 7 illustrates a computer system that may be used to perform some or all of the operations set forth in the operational mode depicted in FIG. 5.

FIG. 7 illustrates a computer system 700 that may be used to perform some or all of the operations set forth in the operational mode 500. The computer system 500 may include, for example, a computer system to control a substantially elliptical-shaped tip forming system. The computer system 500 may also include an environment in which the data storage device/servo positioning system 100 may be implemented. In this respect, the computer system 700 may be used as a platform for executing one or more of the functions of the data storage device/servo positioning system 100.

The computer system 700 includes one or more controllers, such as a processor 702. The processor 702 may be used, for instance, to execute some or all of the steps described in the operational mode 500. Commands and data from the processor 702 are communicated over a communication bus 704. The computer system 700 also includes a main memory 706, such as a random access memory (RAM), where the program code may be executed during runtime, and a secondary memory 708. The main memory 706 may be embodied, for instance, as the storage device 100. The secondary memory 708 includes, for example, one or more hard disk drives 710 and/or a removable storage drive 712, representing a floppy diskette drive, a magnetic tape drive, a compact disk drive, etc., where a copy of the program code for the operational mode 500 may be stored.

The removable storage drive 710 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor 702 and convert the display data into display commands for the display 720. In addition, the processor 702 may communicate over a network, for instance, the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A device comprising:
    a substrate comprising at least one pit having a substantially elliptical shape;
    a probe having a tip, wherein the tip contains a substantially elliptical cross-sectional shape, and wherein the tip is used to create the at least one pit in the substrate; and
    wherein one or both of the substrate and the probe are configured to move with respect to each other such that the tip is moved into and out of the at least one pit through the relative movement.

2. The device according to claim 1, wherein the relative movement is along one or both of an across track direction and a down track direction with respect to the substrate, the across track direction being perpendicular to the down track direction, wherein the tip has a first width and a second width, the first width being larger than this second width, and wherein the first width extends in the across track direction and the second width extends in the down track direction.

3. The device according to claim 2, wherein the probe is configured to follow either or both of the across track direction and the down track direction such that a center of the tip is aligned with a center of the at least one pit, and wherein the tip is shaped to enable substantially lower sensitivity in response to the center of the tip deviating from the center of the at least one pit.

4. The device according to claim 3, wherein substrate includes a plurality of pits, and wherein the tip is further shaped to enable a substantially high density of the plurality of pits in the down track direction.

5. The device according to claim 1, wherein the substrate comprises a polymer material.

6. The device according to claim 1, wherein the probe comprises a cantilever beam and wherein the tip is located proximate to a distal end of the cantilever beam.

7. The device according to claim 1, wherein the substrata comprises a data storage device and wherein the at least one pit represents a data bit.

8. The device according to claim 1, wherein the substrate comprises a servo positioning system and wherein the at least one pit represents a servo positioning information.

9. The device according to claim 1, wherein the tip has a first width and a second width, and wherein the first width is between approximately 25-300% larger than the second width.

10. A device comprising:
    means for storing information, wherein the information is represented with pits having substantially elliptical shapes;
    means for reading the stored information, said means for reading comprising a tip having a substantially elliptical cross-sectional shape; and
    means for enabling relative movement between the means for storing and the means for reading, wherein relatively movement between the means for storing and the means for reading is configured to cause the means for reading to be moved into and out of the pits.

11. The device according to claim 10, wherein the means for storing comprises means for receiving the pits that represent the information.

12. The device according to claim 10, wherein the means for reading further comprises means for writing the pits.

13. The device according to claim 10, wherein the means for enabling relative movement comprises means for moving at least one of the means for storing and the means for reading along either or both of an across track direction and a down track direction, the across track direction being perpendicular to the down track direction and wherein the tip has a first width and a second width, the first width being larger than the second width, and wherein the first width extends in to across track direction and the second width extends in the down track direction.

14. The device according to claim 13, wherein the means for reading is configured to follow either or both of the across track direction and the down track direction such that a center of the tip is aligned with centers of the pits, and wherein the tip is shaped to enable substantially lower sensitivity in response to the center of the tip deviating from the center of the at least one pit.

15. The device according to claim 14, wherein the tip is further shaped to enable a substantially high density of the pits in the down track direction.

16. The device according to claim 10, wherein the means for reading comprises a cantilever beam and wherein the tip is located proximate to a distal end of the cantilever beam.

* * * * *

UNITED STATES PATENT AND TRADEMARK OFFICE
CERTIFICATE OF CORRECTION

PATENT NO. : 7,295,506 B2  Page 1 of 1
APPLICATION NO. : 10/913477
DATED : November 13, 2007
INVENTOR(S) : Donald Fasen et al.

It is certified that error appears in the above-identified patent and that said Letters Patent is hereby corrected as shown below:

In column 9, line 34, in Claim 2, delete "this" and insert -- the --, therefor.

In column 10, line 1, in Claim 7, delete "substrata" and insert -- substrate --, therefor.

In column 10, line 37, in Claim 13, delete "to" and insert -- the --, therefor.

Signed and Sealed this

Eighth Day of July, 2008

JON W. DUDAS
*Director of the United States Patent and Trademark Office*